April 7, 1925.　　　　　　　　　　　　　　1,532,176
F. GAUSS
MOTOR VEHICLE OF ANY KIND
Filed July 21, 1922
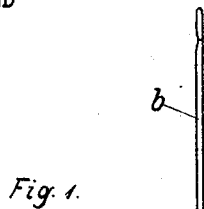
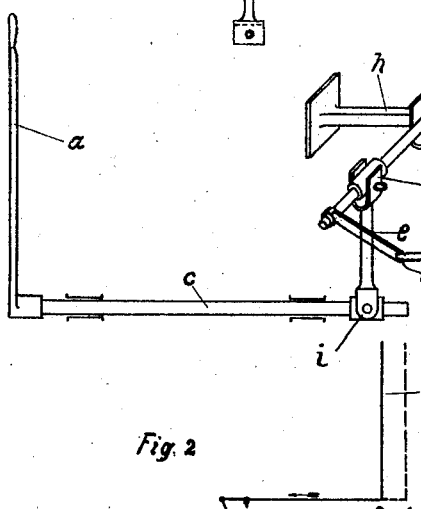
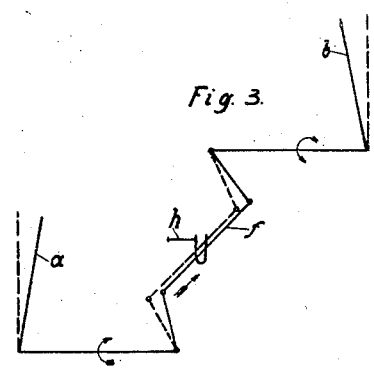
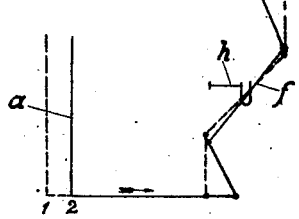
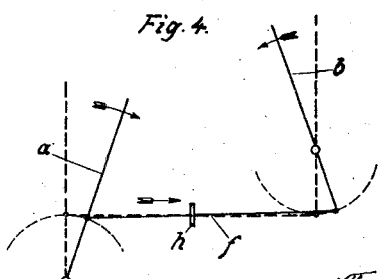

Patented Apr. 7, 1925.

1,532,176

UNITED STATES PATENT OFFICE.

FRIEDRICH GAUSS, OF OBERTURKHEIM, GERMANY, ASSIGNOR TO DAIMLER-MOTOREN-GESELLSCHAFT, OF UNTERTURKHEIM, GERMANY.

MOTOR VEHICLE OF ANY KIND.

Application filed July 21, 1922. Serial No. 576,636.

*To all whom it may concern:*

Be it known that I, FRIEDRICH GAUSS, residing at Oberturkheim, Wurttemberg, Germany, have invented certain new and useful Improvements in Motor Vehicles of any Kind, of which the following is a specification.

The present invention relates to improvements in motor vehicles of any description such as automobiles, railroad locomotives, tramway vehicles, traction engines, tractors, trailers, freight cars, and the like, more especially in connection with such motor vehicles of this type which are adapted to run in either direction and are provided with differential gears so that they can be run at varying speeds.

With vehicles of this kind hand levers are usually arranged at both ends viz, at the front and rear end of the vehicles so that the control gearing may be operated from both ends of the vehicle.

According to the methods heretofore adopted the gear or hand levers are so connected with each other that any movement imparted to one of the hand levers simultaneously produces the same movement of the hand lever arranged at the opposite end of the same vehicle.

In order to attain this simultaneously executed movement of both hand levers arranged at the front and rear end of the same vehicle the shafts carrying the hand or gear levers have been heretofore connected with a pair of shafts.

Owing the fact, that with these known constructions, the shafts carrying the hand or gear levers are subjected both to axial displacement and to angular movement when the gears are thrown into engagement the use of a pair of connecting shafts was absolutely necessary. Of these two connecting shafts, one allows the axial displacement of the shaft carrying the gear or handlever, whilst the other one allows the angular movement, or a movement askew, of the shafts carrying the gearing or handlevers.

The improvements according to this invention consists in the application and use of one single connecting shaft instead of a pair of same as used hitherto, and furthermore that through this single connecting shaft both the axial displacement and the angular or skewing motion of the shafts of the two gear or handlevers arranged at the two ends of the vehicle are effected. The said shaft that connects the two handlevers arranged at the two opposite ends of the vehicle and may be termed the main-shaft is prevented from axial displacement out of its own plane of movement by mounting the same in a bearing or in any other suitable supporting element.

Owing to the fact that the said connecting shaft is seated in a bearing the same is not only prevented from moving out of its own plane of axial displacement but moreover to the said shaft is imparted a movement around its own axis.

These objects of the present invention are attained by the mechanism illustrated in the accompanying drawing in which:

Figure 1 shows diagrammatically the whole of the arrangement of the levers in their inoperative position and Figure 1ª is a side view of Figure 1.

In Figure 2 the full lines represent diagrammaticaly the whole arrangement after the hand or control levers have been operated and after the shafts of the gear or handlevers have been subjected to axial displacement whilst in the dotted lines the levers are shown in their normal or inoperative position.

Figure 3 shows in full lines the position of the levers after the shafts of the gear or handlevers have been given an angular movement, whilst the dotted lines in this Figure 3 indicates the position occupied by the levers after the shafts of the gear or handlevers have been subjected to axial displacement.

Figure 4 is a side view of Figure 3.

$a$ indicates one of the two handlevers arranged at the opposite ends of the vehicle or of the arrangement of levers.

The handlever $a$ is firmly attached to one end of the shaft $c$ while at its opposite end the said shaft carries a jointed coupling $j$ connecting the shaft $c$ with the lever $e$. This lever $e$ carries at its opposite end a joined coupling $k$ connecting one end of the shaft $f$ with the shaft $c$.

$b$ is the handlever arranged at the opposite end of the vehicle or of the arrangement of levers.

Similarly this lever $b$ is firmly attached to one end of the shaft $d$, whilst at its opposite end the said shaft $d$ also carries a jointed coupling $l$ which connects the shaft $d$ with the lever $g$. At its other end the lever $g$ carries a jointed coupling $m$ connected thereby to, and carrying the other end of the shaft $f$.

In the drawing, which diagrammatically represents the invention, the said connecting shaft $f$ is carried and supported in a bearing $h$ which permits the movement of this shaft in one plane only.

Figure 1ª shows a side view of the lever $g$.

The connection between the lever $g$ and shaft $f$ on the one hand, and between the lever $e$ and shaft $f$ on the other hand is such that the parts connected may be easily moved.

The levers $g$ and $e$ may also be made in two parts in order to allow the same to turn with regard to each other.

The operation of the arrangement described is as follows:—

When the lever $b$ after being operated is brought from the inoperative position as represented in Figure 1 into the position shown in full lines in Figure 2 owing to the axial displacement of this lever $b$ the shaft $f$ is caused to rotate.

Owing to the fact that the levers $g$ and $e$ are arranged in planes situated above and below the shaft $f$ and that they operate in two directions opposite to each other, the lever $a$ is displaced to the same extent and in the same direction as the lever $b$.

The bearing $h$ prevents the shaft $f$ from being axially displaced in a plane different to that of the turning movement for its movement being controlled by the bearing the said shaft $f$ must necessarily rotate around its longitudinal axis.

Now if for example lever $b$ is brought from the position shown in Figure 2 into the positions represented in Figures 3 and 4 the shaft $f$ is displaced axially, and consequently the lever $a$ is displaced in the same direction and to the same extent as the lever $b$.

The technical advantage attained by this invention may be summarized thus that with the known systems one of the two main shafts serves for the axial displacement and the other one for the turning of the speed changing gear, whilst with the present invention both movements are effected—as described—by one single main shaft.

The hinged joints $j$ and $k$ connecting the main shaft $f$ with the lever $c$ and the joints $m$ and $l$ connecting the lever $g$ with the shaft $f$ articulate in planes perpendicular to each other.

What I claim is:—

1. In a motor vehicle, the combination with change speed gear and a shaft operatively connected therewith; of devices at each end of said shaft adapted to operate the same in a direction longitudinal of the said shaft and also to rotate the same, said shaft in being submitted to rotation and to longitudinal displacement, being simultaneously exposed to a swinging motion; the above mentioned operating devices at each end of said shaft being so connected to said shaft that when such devices at one end of said shaft are operated, thereby operating said shaft, the devices at the other end of said shaft are also operated in a corresponding manner; means also being provided to enable all movements of said shaft being carried out in the same plane.

2. In a motor vehicle, the combination with change speed gear and a shaft operatively connected therewith; of devices at each end of said shaft adapted to operate the same in a direction longitudinal of the said shaft and also to rotate the same, said devices being so arranged that the rotating and longitudinally displacing movements produced, are transmitted and imparted in the same sense and in the same direction to the devices disposed at the opposite end of said shaft; means for taking over said movements at the opposite end of said shaft; the aforementioned devices for operating said shaft in a direction longitudinally thereof and to rotate the same, comprising a lever extending at right angles to said shaft, and a second lever extending at right angles to said shaft and also at right angles to said first-named lever; said first-named lever being operatively connected at one end to said shaft and at the other end to said second-named lever so as to be adapted to swing freely with relation to said shaft and with relation to said second-named lever in directions longitudinal of same respectively, but to swing with said shaft and said second-named lever when said shaft or said second-named lever is rotated.

3. In a motor vehicle, the combination with change speed gear and a shaft operatively connected therewith; of devices at each end of said shaft adapted to operate the same in a direction longitudinal of the said shaft and also to rotate the same; said devices comprising a lever extending at right angles to said shaft, a second lever extending at right angles to said shaft and also at right angles to said first-named lever, a third lever extending at right angles to said shaft but in an opposite direction from said first-named lever, that is to say, at an angle of one hundred and eighty degrees therewith, and a fourth lever extending at right angles to said shaft and also at right angles to said third-named lever; said first and third named levers being each operatively connected at one end to said shaft and at their other end to said second- and fourth-named levers respectively so as to be adapted to swing freely with relation to said shaft and with relation to said second- and fourth-named levers respectively in directions longitudinal of same respectively, but to swing with said shaft and with said second- and fourth-named levers when said shaft or said second- or fourth-named levers respectively are rotated.

In testimony whereof I have affixed my signature in presence of two witnesses.

FRIEDRICH GAUSS. [L. S.]

Witnesses:
M. W. ALTAFFER,
WALTER BRAUM.